March 22, 1938. C. F. SCHNUCK 2,111,693
DRIVE MECHANISM FOR RUBBER MILLS OR THE LIKE
Filed July 8, 1937 5 Sheets-Sheet 1

March 22, 1938. C. F. SCHNUCK 2,111,693
DRIVE MECHANISM FOR RUBBER MILLS OR THE LIKE
Filed July 8, 1937 5 Sheets-Sheet 2

Inventor
Carl F. Schnuck
By Rockwell Bartholow
Attorneys

March 22, 1938.  C. F. SCHNUCK  2,111,693
DRIVE MECHANISM FOR RUBBER MILLS OR THE LIKE
Filed July 8, 1937  5 Sheets-Sheet 3

Inventor
Carl F. Schnuck
By Rockwell-Bartholow
Attorneys

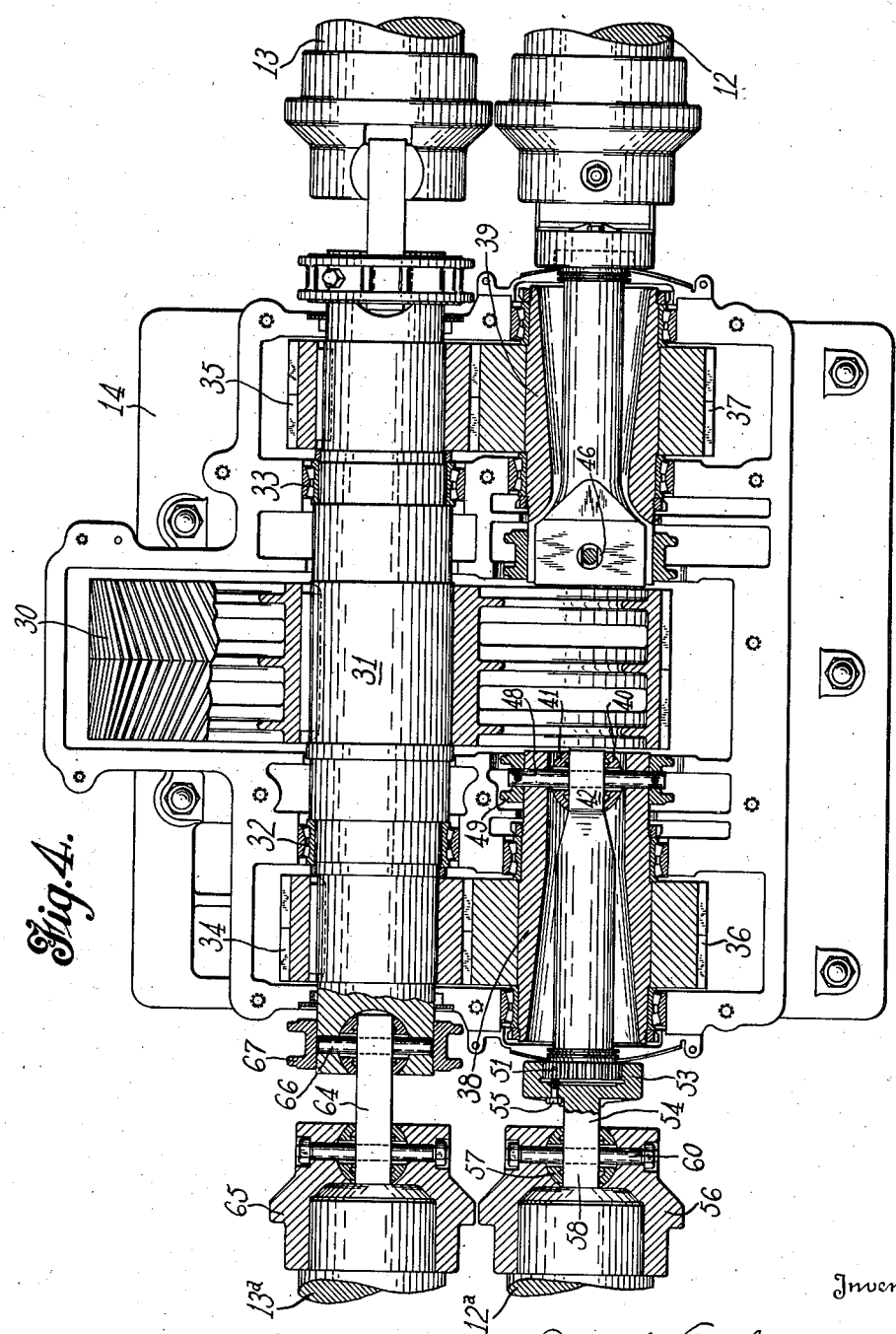

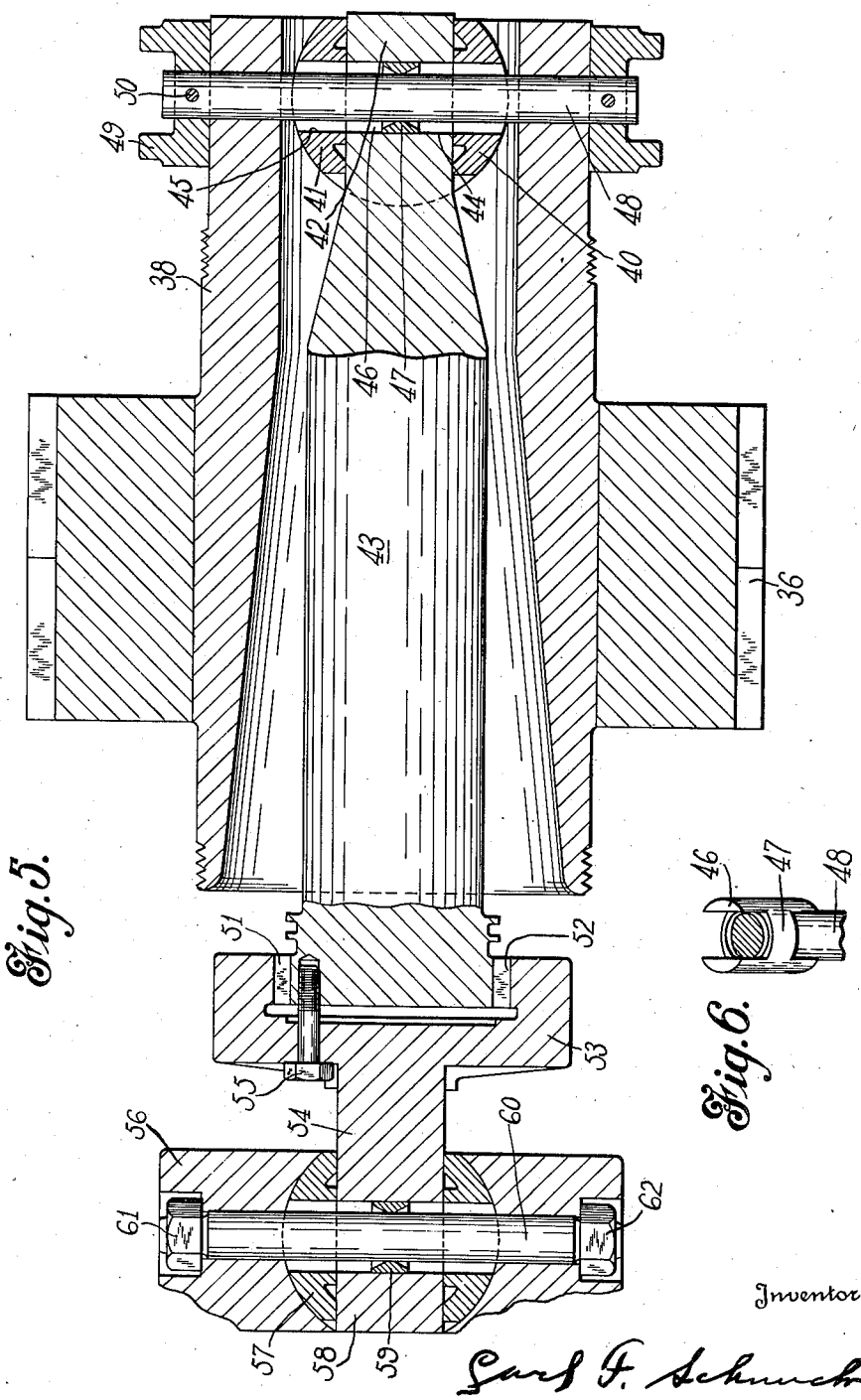

Patented Mar. 22, 1938

2,111,693

UNITED STATES PATENT OFFICE 2,111,693

DRIVE MECHANISM FOR RUBBER MILLS OR THE LIKE

Carl F. Schnuck, New Haven, Conn., assignor to Farrel-Birmingham Company, Incorporated, Ansonia, Conn., a corporation of Connecticut Application July 8, 1937, Serial No. 152,578

13 Claims. (Cl. 74—389)

This invention relates to a drive mechanism for rubber mills or the like, and more particularly to a unitary drive mechanism separate from the mill itself, which mechanism shall contain all of the necessary drive gearing, including the reduction gearing, so that the device to be driven may be free and clear of all such mechanism. The drive mechanism herein described and claimed may be used with a variety of devices for treating rubber or similar plastic material such as sheeters, refiners, warmers, and other similar devices, particularly such devices as employ one or more pairs of cooperating rolls disposed in a horizontal plane, although it will be understood that the principles of the invention are not necessarily limited to such devices.

In driving rubber mills of the character described, it is usually necessary, particularly when an electric motor is used as a source of power, to provide reduction gearing to effect a speed reduction between the motor and the rolls of the mill. Usually, also, in the case of a good many devices for treating rubber or other plastic materials, one of a pair of cooperating rolls is adjustable with respect to the other, and this adjustment must be possible while the driving relationship between this roll and the source of power is maintained. This makes necessary a universal joint or some similar device for permitting the adjustment of such roll, and tends to make more complex the drive mechanism which usually is supported upon or connected with the frame of the mill itself.

One object of the present invention is to provide a self-contained drive mechanism for mills for treating rubber or other plastic materials, having provision for driving two or more cooperating rolls, and being so constructed that it will be relatively simple and require a minimum of space when installed.

A still further object of the invention is the provision of a unitary mechanism for rubber mills or the like, which may be capable of being placed between two mills in order that both may be driven from the same source of power and through the unitary drive mechanism illustrated.

A still further object of the invention is the provision of a unitary drive mechanism for rubber mills which shall have provision for mounting an electric motor or similar source of power, and which shall contain not only the necessary reduction gearing, but also provide for universal movement of certain of the shafts extending from the drive mechanism, so that the mills themselves may be entirely free from any part of the driving devices.

Still another object of the invention is the provision of a drive mechanism which shall contain suitable reduction gearing, and which shall be provided with at least a pair of drive shafts extending from each side thereof, so that the mechanism may be placed between and employed to drive two separate mills, one on either side thereof, certain of the shafts having provision for lateral movement while being maintained in proper driving relation with the source of power.

To these and other ends the invention consists in the novel features and combinations of parts to be hereinafter described and claimed.

In the drawings:

Fig. 4 is a horizontal sectional view on line 4—4 of Fig. 1;

Fig. 5 is a sectional view of one of the hollow shafts with its associated quill shaft, showing the construction of the universal joint employed; and Fig. 6 is a detail perspective view of a part of one of the universal joints.

Figure 1:
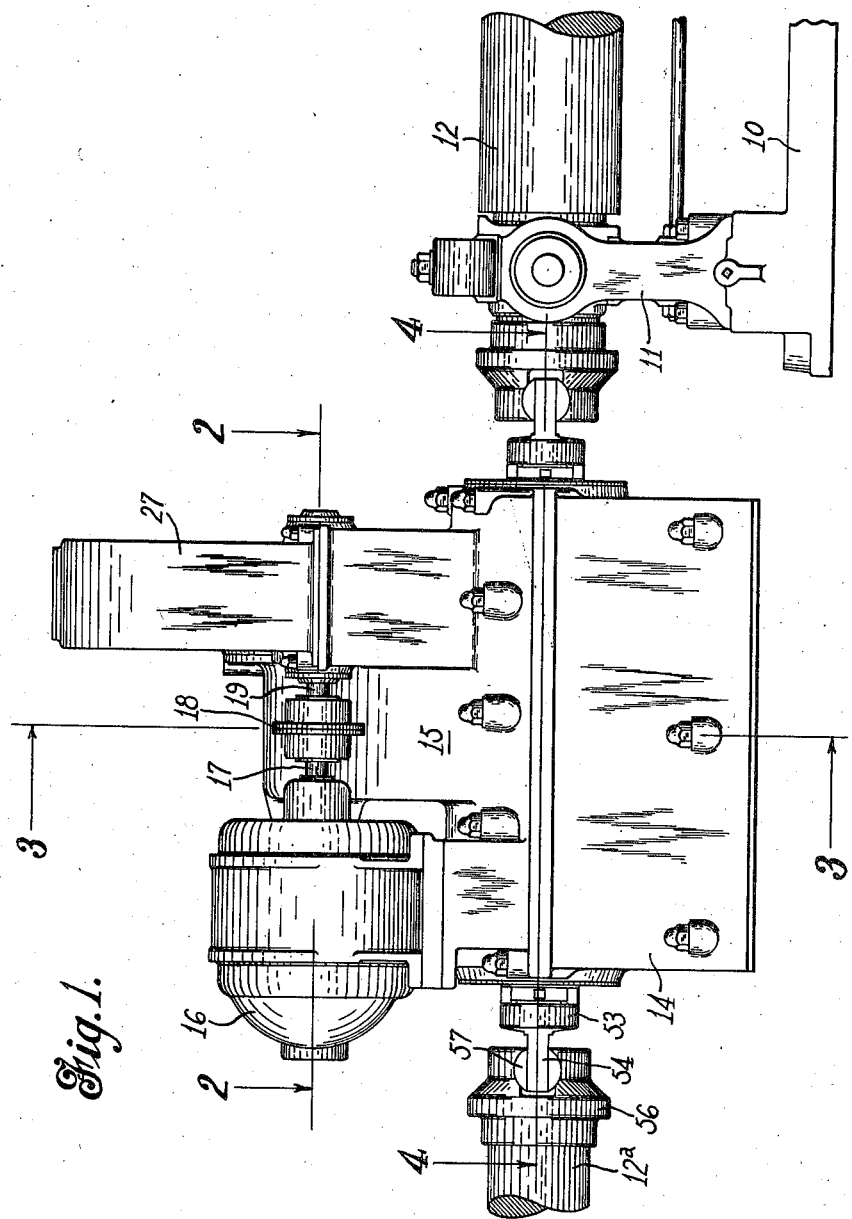
Fig. 1 is a front elevational view of a drive mechanism embodying my invention, and also showing in a conventional manner the adjacent parts of a rubber mill.
Figure 2:
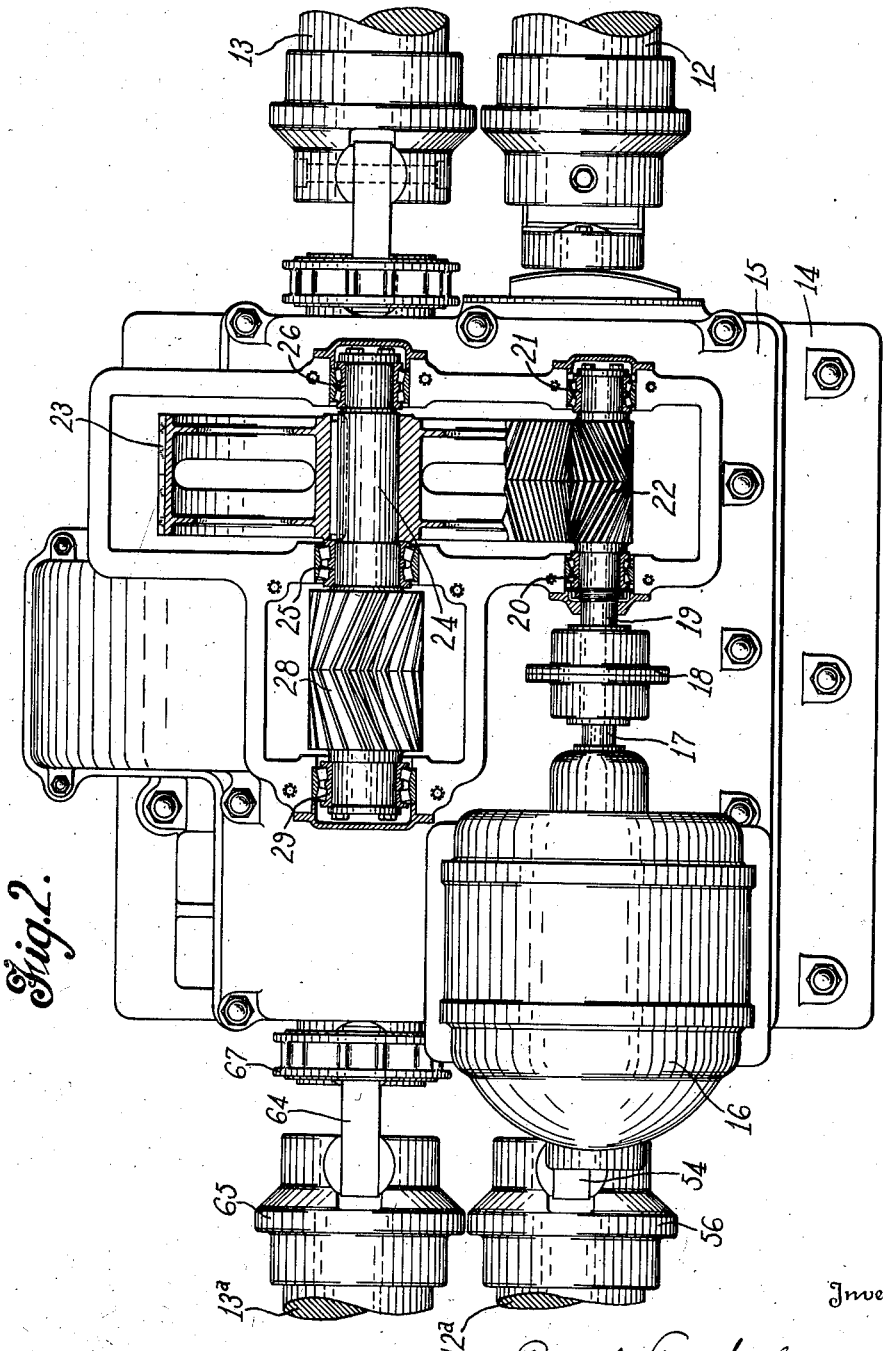
Fig. 2 is a plan view partly in section on line 2—2 of Fig. 1.

To illustrate a preferred embodiment of my invention, I have shown in the drawings a portion of a conventional rubber mill having a frame 10 comprising a side standard 11 supporting one end of each of two rolls 12 and 13, these parts merely being shown in a conventional manner. Although not illustrated in the drawings, it will be understood that the roll 12 will usually be adjustable laterally with respect to the roll 13, so that the roll bite between these rolls may be adjusted as desired.

The drive mechanism comprises a support or housing 14 having a cover 15 upon which is mounted an electric motor 16, which serves as a source of power. The shaft 17 of the motor is connected through a universal coupling 18 to the shaft 19 mounted in bearings 20 and 21 in a part of the cover 15, and carrying a pinion 22, which pinion is in mesh with a gear 23 secured to a shaft 24 mounted in bearings 25 and 26 on the cover 15. It will be understood that the pinion 22 and gear 23 may be covered by the upper cover member 27, shown in Fig. 1.

Figure 3:
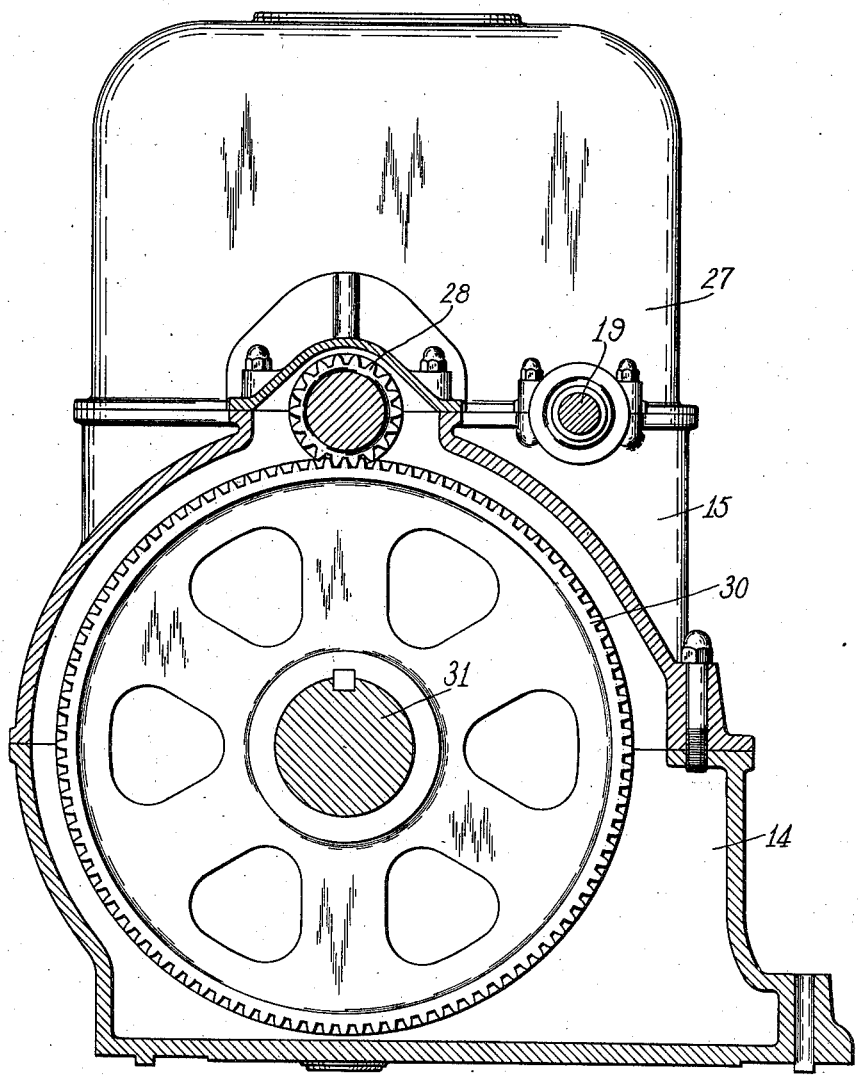
Fig. 3 is a vertical sectional view on line 3—3 of Fig. 1.

The shaft 24 extends beyond the bearing 25 and is provided on its extended portion with a pinion 28, the end of the shaft also having a bearing at 29 in the housing. The pinion 28 in turn meshes with a bull gear 30 mounted upon a shaft 31, as shown more particularly in Figs. 3 and 4, so that the latter is driven from this pinion. It will be evident that the gear 30 will be driven at a relatively slow speed compared to that of the motor, owing to the reduction gearing interposed between the motor shaft and this gear.

As shown in Fig. 4, the shaft 31 is provided with bearings 32 and 33 in the housing 14, and extends outwardly at both ends beyond these bearings, the extended ends carrying drive pinions 34 and 35, and being provided beyond these drive pinions with connections to the rolls of the mills, as will be presently described.

The rubber mill at one side of the drive mechanism has already been briefly described, and referring to Figs. 1 and 4, it will be seen that provision is made for a separate mill upon the other side of the device, which mill may be provided with rolls 12ᵃ and 13ᵃ, shown in a fragmentary way in Fig. 4. The ends of the shaft 31 are adapted to be flexibly connected to the rolls 13 and 13ᵃ, as will be explained hereinafter.

The pinions 34 and 35 mesh respectively with pinions 36 and 37 secured to relatively short hollow quill shafts 38 and 39, these shafts being mounted upon suitable bearings in the housing 14. It is noted that the inner ends of these shafts terminate short of the bull gear 30, so that the shafts in effect extend outwardly in both directions from this gear, and are adapted to be connected to the rolls 12ᵃ and 12, respectively, through universal joints, so that these rolls will have freedom for adjustment, and still maintain their driving connection with the shafts 38 and 39. The connection between the quill shafts 38 and 39 and the respective rolls will now be described, and as this connection is identical in respect to both of these shafts, the description of one only will suffice.

As illustrated in Figs. 4 and 5, the shaft 38 is hollow, and in opposed openings at its inner end are disposed segmental bearing members 40 and 41, these members extending transversely of the shaft through the bore thereof, and receiving between them the flat paddle-shaped end 42 of a solid shaft 43, the latter being disposed within the shaft 38, as shown in Fig. 5, and extending longitudinally thereof so that its other end projects from the interior of the shaft 38. The end 42 of the shaft 43 is provided with a transversely extending opening 44 registering with openings 45 extending transversely of the bearing members 40 and 41. Within the opening or bore 46 is disposed a collar or bushing 46, shown more especially in Fig. 6 of the drawings, this bushing not only being hollow, but being slotted at both ends so as to leave a relatively narrow central band 47, which is substantially V-shaped in cross-section, as shown more especially in Fig. 5. Through this collar is inserted a pin 48, the diameter of which is substantially equal to the width of the slots cutting the ends of the member 46, so that this member may rock upon the central band 47, and the pin 48 be received within the slotted portion of the member 46 beyond the bore through this member. The pin 48 is held in place by a collar 49 about the shaft 38, smaller pins 50 securing the pin 48 to the collar.

It will be apparent that this pin 48 acts as a pivot member for the solid shaft 43, the latter rocking about the pin 48 when moved in a direction toward or away from the observer, as viewed in Fig. 5. During this movement the member 43 and collar 46 merely rotate about the pin 48. The member 43 is also capable of movement up or down, as viewed in Fig. 5, and during such movement the bearing members 40 and 41 rotate with respect to the quill shaft 38 within limits permitted by the openings 45 and pin 48, the pin 48 during such movement being received in the outer portions of the slots in the collar 46. The combination of these two movements provides a universal connection between the quill shaft 43 and the shaft 48. Moreover, it may be noted that the connection of the shaft 43 with the shaft 38 is at the inner end of the latter member, so that these shafts, while universally connected, are substantially coextensive, and by this method a considerable saving in the dimensions of the driving mechanism is effected, which means a great saving in floor space, as the mills upon either side of the driving mechanism can be spaced closer together.

The outer end of the solid shaft 43 is provided with a series of external teeth 51 which are locked between the internal teeth 52 on a collar 53 secured at the end of a link member 54. Longitudinal movement between the collar 53 and shaft 43 is prevented by any suitable means, such, for example, as the screw 55. This connection between the solid shaft and the collar 53 provides a rigid driving connection between these two members, while at the same time it permits the collar to be moved longitudinally and thereby disassembled from its connection to the shaft when the screw 55 is removed.

The link 54 is provided with a universal connection with the coupling 56 on the roll 12ᵃ, this connection being similar to that illustrated at the inner end of the shaft 43, and comprises bearing members 57 rotatably mounted in the coupling 56, and receiving between them the end 58 of the link 54, having a transverse slot to receive a collar 59 similar to the collar 46, through which extends the pin 60, which may in this instance be provided with an enlarged head 61 and a threaded nut 62, so that it may readily be removed. It will, of course, be understood that the quill shaft 39 is connected with the roll 12 in the same manner that the shaft 38 is connected with the roll 12ᵃ.

As will be noted from Fig. 1, the bearing members 57 and end 58 of the link 54 are received in an opening which extends transversely through the coupling member 56, so that when the pin 60 is removed, bearing members 57, collar 58, and link 54 may be disengaged from the coupling 56, and withdrawn from the assembly by a transverse movement of these parts relatively to the coupling 56. Before withdrawal, it is, of course, understood that the screw 55 is removed and the collar and link are moved to the left to disengage the teeth 52 of the collar from the teeth 51 of the solid shaft 43. This movement to the left, as shown, for example, in Figs. 4 and 5, is permitted by the clearance space between the end 58 of the link and the outer face of the neck of the roll 12ᵃ. To disengage these parts, it is, therefore, only necessary to remove the screw 55 and pin 60, slide the collar 53 and link 54 to the left, as shown in Fig. 4, and the collar, link and associated bearing members 57 are free for withdrawal transversely from the coupling 56.

It has already been stated that the shaft 31 is adapted for a flexible or universal connection with the rolls 13 and 13ᵃ. The connection with the shaft 13ᵃ is shown in Fig. 4, and it will be understood that the same kind of connection is employed with the shaft 13. This connection comprises a link 64 having a universal connection at one end with cap 65 of the roll 13ᵃ, this connection being the same as described as employed between the link 54 and the coupling 56 of the roll 12ᵃ. The inner end of the link 64 is likewise connected with a universal connection with the shaft 31, this connection being substantially the same as employed at the other end of this link, except that the securing member is in this instance a pin 66 passing through the shaft 31, and held in place by a collar 67 surrounding the shaft 31 and secured in place in any suitable manner.

It will be apparent that the drive mechanism heretofore described is extremely compact and requires a minimum of floor space. Moreover, it is a duplex drive, in that it is designed for the driving of one mill upon each side of the mechanism, and moreover, the driven rolls are connected universally to the respective drive shafts of the drive mechanism in such a manner that a minimum of space is required. This is particularly true of the quill shafts 38 and 39, and the shafts 43 mounted therein, as each of these hollow shafts is substantially coextensive in length with the inner solid shaft.

It will be understood that, while the improved drive is illustrated in connection with two mills, it is not limited in this respect, and may be advantageously employed in connection with a single mill, in which case the driving connections at one side only would be used. Also any type of flexible couplings may be employed in place of the universal couplings shown, such, for example, as the well-known splined couplings, or those using internal-external gear teeth or jaw clutch construction.

While I have shown and described a preferred embodiment of my invention, it will be understood that it is not to be limited to all of the details shown, but is capable of modification and variation within the spirit of the invention and within the scope of the appended claims.

What I claim is:

1. A driving mechanism for a rubber mill having a pair of cooperating rolls, said mechanism comprising a supporting housing, a pair of drive shafts mounted therein, intermeshing pinions on said shafts, a motor supported on said housing, reduction gearing mounted in the housing and connecting the motor shaft with one of the drive shafts, and each of said drive shafts having a flexible driving connection with one of the mill rolls, the inner end of one of said shafts extending into the housing beyond the end of the other shaft, and said reduction gearing including a bull gear mounted on the end of said first shaft beyond the inner end of the second shaft.

2. A driving mechanism for a rubber mill having a pair of cooperating rolls, said mechanism comprising a supporting housing, a pair of drive shafts mounted therein, intermeshing pinions on said shafts, a motor supported on said housing, reduction gearing mounted in the housing and connecting the motor shaft with one of the drive shafts, and each of said drive shafts having a flexible driving connection with one of the mill rolls, said drive shafts being disposed in the same horizontal plane, and said motor being mounted thereabove, the inner end of one of said shafts extending into the housing beyond the end of the other shaft, and said reduction gearing including a bull gear mounted on the end of said first shaft beyond the inner end of the second shaft.

3. A driving mechanism for a rubber mill having a pair of cooperating rolls, said mechanism comprising a supporting housing, a pair of drive shafts mounted therein, intermeshing pinions on said shafts, a motor supported on said housing, reduction gearing mounted in the housing and connecting the motor shaft with one of the drive shafts, and each of said drive shafts having a flexible driving connection with one of the mill rolls, one of said drive shafts being hollow and its connection with the respective mill roll comprising a shaft disposed within the hollow drive shaft, and having a universal connection with the drive shaft at its inner end, the inner end of one of said shafts extending into the housing beyond the end of the other shaft, and said reduction gearing including a bull gear mounted on the end of said first shaft beyond the inner end of the second shaft.

4. A drive mechanism for a ruber mill having a pair of cooperating rolls, said mechanism comprising a supporting housing, a pair of drive shafts mounted therein, intermeshing pinions on said shafts, a motor on said housing, reduction gearing mounted in the housing and connecting the motor shaft with one of the drive shafts, said last-named drive shaft having a flexible connection with one of the mill rolls, the other of said drive shafts being hollow, a solid shaft disposed within the hollow shaft and having a universal connection therewith at its inner end, a member drivingly connecting said solid shaft with the other mill roll, said member being separable from the solid shaft by a longitudinal movement relatively thereto, and said member being releasable from the roll to which it is connected by a transverse movement.

5. A drive mechanism for a rubber mill having a pair of cooperating rolls, said mechanism comprising a supporting housing, a pair of drive shafts mounted therein, intermeshing pinions on said shafts, a motor on said housing, reduction gearing mounted in the housing and connecting the motor shaft with one of the drive shafts, said last-named drive shaft having a flexible connection with one of the mill rolls, the other of said drive shafts being hollow, a solid shaft disposed within the hollow shaft and having a universal connection therewith at its inner end, a member drivingly connecting said solid shaft with the other mill roll, said member having a collar thereon provided with internal teeth, and the adjacent end of the solid shaft being provided with external teeth meshing therewith whereby said elements are in driving relation but separable one from the other by a relative longitudinal movement, and said member being releasable from the roll to which it is connected by a transverse movement.

6. In a drive mechanism for a rubber mill or the like having a pair of cooperating rolls, a support, a driven shaft mounted on said support, said shaft being hollow, a solid shaft within said hollow shaft and connected thereto at its inner end, a link having a flexible connection with one of said rolls, and means rigidly connecting said link to the outer end of the solid shaft, said means being separable by relative longitudinal movements of said solid shaft and link, and said link being disengaged from the roll to which it is connected by a transverse movement.

7. In a drive mechanism for a rubber mill or the like having a pair of cooperating rolls, a support, a driven quill shaft mounted on said support, a solid shaft within said quill shaft and connected thereto at its inner end, a link having a flexible connection with one of said rolls, and means rigidly connecting said link to the outer end of the solid shaft, said means being separable by relative longitudinal movements of said shaft and link, and said means comprising an internally toothed collar on one of said members and interfitting externally formed teeth on the other of said members, and said link being disengaged from the roll to which it is connected by a transverse movement relatively thereto.

8. A drive mechanism for a pair of spaced rubber mills each having a pair of cooperating rolls, said mechanism comprising a supporting housing positioned between said mills, a driven shaft in said housing the ends of which project therefrom, means flexibly connecting each end of the shaft with one roll of each of said mills, a pair of relatively short shafts in the housing, said shafts being in alignment and parallel to said first-named shaft, means for driving said short shafts from said first-named shaft, and means flexibly connecting said short shafts respectively with the other rolls of said mills.

9. A drive mechanism for a pair of spaced rubber mills each having a pair of cooperating rolls, said mechanism comprising a supporting housing positioned between said mills, a driven shaft in said housing the ends of which project therefrom, means flexibly connecting each end of the shaft with one roll of each of said mills, a pair of relatively short shafts in the housing, said shafts being in alignment and parallel to said first-named shaft, means for driving said short shafts from said first-named shaft, means flexibly connecting said short shafts respectively with the other rolls of said mills, a bull gear mounted on said first shaft and extending between the inner ends of said short shafts, and means to drive said bull gear.

10. A drive mechanism for a pair of spaced rubber mills each having a pair of cooperating rolls, said mechanism comprising a supporting housing positioned between said mills, a driven shaft in said housing the ends of which project therefrom, means flexibly connecting each end of the shaft with one roll of each of said mills, a pair of relatively short shafts in the housing, said shafts being in alignment and parallel to said first-named shaft, means for driving said short shafts from said first-named shaft, means flexibly connecting said short shafts respectively with the other rolls of said mills, a bull gear mounted on said first shaft and extending between the inner ends of said short shafts, means to drive said bull gear, said means comprising a motor supported on the housing, and reduction gears in the housing between the motor and bull gear.

11. A drive mechanism for a pair of spaced rubber mills each having a pair of cooperating rolls, said mechanism comprising a supporting housing positioned between said mills, a driven shaft in said housing the ends of which project therefrom, means flexibly connecting each end of the shaft with one roll of each of said mills, a pair of relatively short hollow quill shafts in said housing, said shafts being in alignment and parallel to said first-named shaft, means for driving said short shafts from said first-named shaft, a shaft within and flexibly connected at its inner end to the inner end of each of said hollow shafts, and said last-named shafts being connected respectively to the other rolls of said mills.

12. A drive mechanism for a pair of spaced rubber mills each having a pair of cooperating rolls, said mechanism comprising a supporting housing positioned between said mills, a driven shaft in said housing the ends of which project from the housing, a bull gear mounted substantially centrally on said shaft, a pair of hollow shafts, one on each side of said gear, having their axes parallel to the axes of said first shaft, means connecting the ends of said first shaft with one of the rolls of each mill respectively, means connecting the hollow shafts respectively with the other rolls of said mills, said last-named means comprising a shaft within each of said hollow shafts having its inner end flexibly connected thereto and its outer end flexibly connected to the respective roll, and means for driving said hollow shafts from said first-named shaft.

13. A drive mechanism for a pair of spaced rubber mills each having a pair of cooperating rolls, said mechanism comprising a supporting housing positioned between said mills, a driven shaft in said housing the ends of which project from the housing, a bull gear mounted substantially centrally on said shaft, a pair of hollow shafts, one on each side of said gear, having their axes parallel to the axes of said first shaft, means connecting the ends of said first shaft with one of the rolls of each mill respectively, means connecting the hollow shafts respectively with the other rolls of said mills, said last-named means comprising a solid shaft within each of said hollow shafts having its inner end flexibly connected thereto and its outer end flexibly connected to the respective roll, means for driving said hollow shafts from said first-named shaft, and said connection between each solid shaft and the respective roll comprising a link flexibly connected to the roll and rigidly connected to the solid shaft, and said rigid connection being detachable by a relative longitudinal movement of the parts.

CARL F. SCHNUCK.